United States Patent Office 3,522,232
Patented July 28, 1970

3,522,232
QUATERNIZED REACTIVE MONOAZO DYE-
STUFFS CONTAINING TRIAZINE AND ISO-
NICOTINIC ACID GROUPS
Sandro Ponzini, Saronno, Paolo Castelli, Cesano Maderno, and Jean S. Lawendel, Milan, Italy, assignors to Aziende Colori Nazionali Affini ACNA S.p.A., Milan, Italy
No Drawing. Original application July 16, 1965, Ser. No. 472,688, now Patent No. 3,416,875, dated Dec. 17, 1968. Divided and this application June 5, 1968, Ser. No. 749,899
Claims priority, application Italy, July 17, 1964, 15,658/64
Int. Cl. C09b 62/78, 62/80, 62/82
U.S. Cl. 260—146                                7 Claims

ABSTRACT OF THE DISCLOSURE

Reactive triazine dyestuffs having the formula:

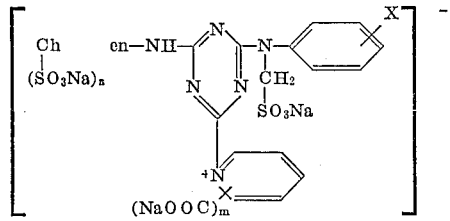

wherein the chromogen is a dyestuff residue selected from the group consisting of azo, metallized azo, anthraquinone and phthalocyanine dyestuff residues, said chromogen being attached to the —NH— bridging group through a carbon atom of an aromatic nucleus of said chromogen selected from the group consisting of benzene and naphthalene, wherein X is selected from the group consisting of H, $CH_3$, $OCH_3$ and $OC_2H_5$; $n$ is an integer from 1 to 4 and $m$ is 1 or 2, are effective for dyeing cellulose fibers. The dyestuffs may be absorbed and fixed onto the cellulose fibers by known hot or cold dyeing techniques. Intense dyeings having very good fastness to washing are obtained.

CROSS-REFERENCE TO RELATED APPLICATION

This application is a division of co-pending application Ser. No. 472,668, filed July 16, 1965, and now U.S. Pat. No. 3,416,875, Dec. 17, 1968.

This invention relates to a series of reactive triazine dyestuffs capable of being absorbed and chemically fixed on cellulose fibers by either a cold or warm dyeing process.

The dyestuffs of the present invention are prepared by a quaternization reaction of the reactive triazine dyestuffs having the general formula:

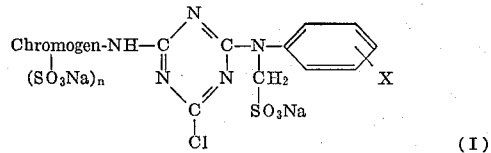

wherein X is selected from the group consisting of H, $CH_3$, $OCH_3$, and $OC_2H_5$; $n$ is an integer from 1 to 4, and chromogen means the colored residue of a dyestuff selected from the group consisting of azo-dyestuffs, metallized-azo-dyestuffs, anthraquinone dyestuffs and phthalocyanine dyestuffs.

The reactive quaternized dyestuffs of the present invention have the general formula:

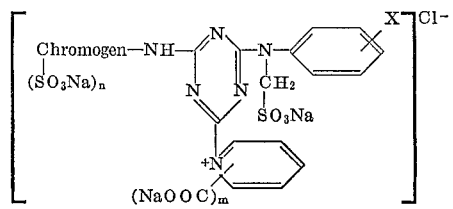

The azo dyestuffs of the present invention have the formula:

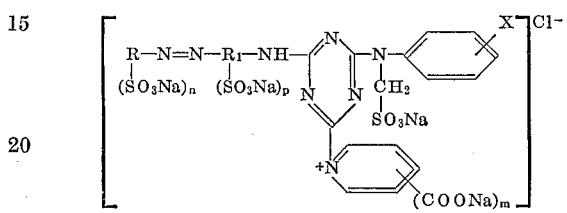

wherein X and $n$ have the above mentioned meanings and $m$ is 1 or 2. The chromogen may be an azoic, azoic-metallized, anthraquinone or phthalocyanine dyestuff.

wherein X is selected from the group consisting of H, $CH_3$, —$OCH_3$ and —$OC_2H_5$; $m$ is 1 or 2; $n$ and $p$ are each 0 or an integer from 1 to 4, and the sum of $n$ and $p$ is from 1 to 4; R is a nucleus selected from the group consisting of the nuclei of the phenyl, naphthyl and pyrazolone series; and $R_1$ is a nucleus selected from the group consisting of the nuclei of the phenyl and naphthyl series.

According to the preferred embodiment of the present invention, the reactive quaternized dyestuffs are prepared by reacting a metal salt of isonicotinic acid with the reactive dyestuffs of the general Formula 1.

In this manner, reactive dyestuffs are obtained which have improved characteristics for applications in dyeing, with dyeing yields increased remarkably and showing the advantage of possible cold or warm application.

It is unexpected that the quaternization of the dyestuffs of the general Formula 1 with a metal salt of isonicotinic acid generally permits obtaining, by the cold method, dyeing yields higher than those obtainable by the use of a dyeing catalyst based on other organic tertiary amines, and particularly with respect to the aliphatic tertiary amines, such as asymmetric dimethylhydrazine. This is especially surprising because it is known that the hydrosolubilizing substituents ($SO_3H$, COOH) diminish the affinity of dyestuffs for cellulose fibers.

Also in the dyeing by the warm process (60–90° C.) of cellulose materials with the same quaternized reactive dyestuffs, improvements in dyeing yields are noticed with respect to the starting dyestuffs. Thus the class of reactive dyestuffs of the present invention can be advantageously applied both at warm and cold temperatures.

The use of isonicotinic acid as the quaternizing agent of the above mentioned chlorotriazine dyestuffs generally produces the following advantages with respect to the use of other quaternizable tertiary amines, the namely:

(1) Dyeing of cellulose fibres by the cold process without adding dyeing catalysts.

(2) Increasing remarkably, in most cases, the dyeing yields, particularly in the cold dyeing process, even when compared to the use of known dyeing catalysts based on aliphatic tertiary amines.

(3) In contrast to the other tertiary the isonicontinic acid is odorless, and therefore the dye baths both cold and warm, are completely free of disagreeable or irritating odors.

(4) Increasing of the dye solubility in the cases where it is particularly poor.

(5) Possibility of dyeing cellulose materials in a warm dye bath by generally used processes, using the same quaternized dyes in those particular cases where practical considerations might suggest this method as the preferable one.

The use of isonicotinic acid, also from the point of view of the costs, in advantageous because the excess of isonictinic acid used in the quaternization reaction may be easily recovered from the mother liquors by filtration, after acidification of these mother liquors, and then it may be reused.

The quternization is generally carried out by dissolving the reactive dyestuff to be used in a 2% solution of a metal salt of the isonicotinic acid.

The reaction temperature may be varied within wide limits, but it is preferably kept between 60 and 80° C. The reaction rate is obviously influenced by the selected temperature and may be controlled by chromatographic analysis.

While the present invention is described with respect to specific examples, it is to be understood that these examples are for purposes of illustration only and that the invention is not limited thereto, since many variations and modifications can be practiced, without departing from its spirit and scope.

The parts and the percentages, unless differently specified, are intended as parts and percentages by weight.

Example 1

2 parts of isonicotinic acid are dissolved in 100 parts of water at 70° C. together with 0.64 part of 100% NaOH.

5 parts of the dyestuff are added to the solution.

The solution is kept at this temperature for a whole night (about 15 hours); the dyestuff after salting out with NaCl is separated by filtration and dried at 60° C. It may be also separated by direct drying.

The dyestuff obtained dyes cotton at a temperature of 35–40° C. with very good tinctorial yields, in red shade having very good fastness to washing.

The dyestuff to be quaternized for use in the process of this example can be obtained as follows:

0.1 mol (18.44 g.) of cyanuric chloride is dissolved in 100–150 parts by volume acetone and the solution is poured into water and ice (total amount 200–600 parts).

A neutral solution of 0.1 mol (20.9 parts) of $C_6H_5NHCH_2SO_3Na$ in 100–130 parts water, cooled at 2–4° C. with ice is poured dropwise and under agitation into the thus obtained suspension of the cyanuric chloride.

During the addition, the temperature of the reaction mass is kept between 0 and 2° C., and the pH between 5 and 6 by suitable pouring dropwise of the acid acceptor solutions (20% $Na_2CO_3$ solution, 1 N NaOH solution, $NaHCO_3$ solution and if desired, Na acetate).

At the end of the addition of the sodium salt of anilino methane sulfonic acid, the agitation is continued until the dissolution is completed, always keeping the temperature of the reaction mass between 0 and 2° C. and the pH between 5 and 6.

After this period of time, the solution thus obtained is neutralized with 1 N NaOH or 10% NaOH solution and if necessary, it is purified of traces of insoluble residue.

The monocondensation product, the sodium salt of 4,6-dichloro-S triazin-2-yl-anilino-methanesulfonic acid is obtained. After 2 hours agitation at 0–3° C. a solution of 18.8 parts (0.1 g. mol) of the 3-amino-4-sulfo-aniline in 150 parts water (pH 7) is added.

The whole is heated to about 40° C. and, keeping this temperature constant, the pH is adjusted and kept between 5.5 and 6.0 by gradual addition of 50–55 parts by volume of a 10% w./v. solution of sodium carbonate.

After 2 hours agitation at a temperature of about 40° C. the solution is cooled to 2–3° C., 6.9 parts (0.1 mol) of sodium nitrite (in form of an aqueous 20% w./v. solution), 80 parts of ice and 25.7 parts of 21° Bé. HCl in form of a thin stream are added.

The reaction mass is agitated for about 10 minutes at the temperature of about 3–4° C.

The suspension of the diazo thus prepared is added within 15 minutes to a solution of 44.6 parts of the sodium salt of N-benzoyl-H-acid in 200 parts by volume of the 17.5% solution of $Na_2CO_3$, cooled at 6–8° C. and having a pH of about 9. The volume of the solution is 1800 parts by volume.

The dyestuff is separated by salting out with 15% w./v. KCl and filtration. It is then dried in a stove at 40° C. for 48 hours.

Example 2

2 parts of isonicotinic acid and 0.64 part of 100% NaOH are dissolved in 100 parts of water at 70° C.

4 parts of the dyestuff are added to the solution.

The solution is maintained at the above said temperature for a whole night (about 15 hours) and then the dyestuff, after salting out with NaCl, is separated by filtration and dried at 60° C. It may be also separated by direct drying.

The dyestuff thus obtained dyes cotton at the temperature of 35–40° C. with high tinctorial yields, in a scarlet shade having excellent wet fastness.

The dyestuff to be quaternized, used in the process of the present example, can be obtained as follows:

0.1 mol (18.44 parts) of cyanuric chloride is dissolved in 100–150 parts by volume of acetone and the solution is poured in water and ice (total amount 200–600 parts).

A neutral solution of 0.1 mol (20.9 parts) of $C_6H_5NHCH_2SO_3Na$ in 100–130 parts by volume, cooled at 2–4° C. with ice, is added dropwise and under agitation, within 20–40 minutes, to the suspension of cyanuric chloride obtained as above described.

During the addition, the temperature of the reaction mass is maintained between 0 and 2° C. and the pH between 5 and 6 by suitable pouring dropwise of acid acceptor solutions (20% $Na_2CO_3$ solution; 1 N NaOH solution; $NaHCO_3$ solution and if desired, Na acetate). At the end of the addition of the sodium salt of the anilino methanesulfonic acid, the agitation is continued until dissolution is completed (about 2 hours), keeping the temperature of the reaction mass between 0 and 2° C. and the pH between 5 and 6.

After this time the solution obtained is neutralized with 1 N NaOH or 10% $Na_2CO_3$ solution, and if necessary, is purified from traces of insoluble residue.

The sodium salt of the monocondensation product, the 4,6-dichloro-s-triazin-2-yl-anilino methane sulfonic acid, is thus obtained.

After 2 hours agitation at 0–3° C., a solution (pH-7) of 26.1 parts (0.1 mol) of the sodium salt of isogamma acid in 400 parts water is added.

The whole is heated at about 40° C. and keeping the temperature constant the pH is adjusted and maintained between 5.5 and 6.0 by gradual addition of 50–55 parts by volume of a 10% w./v. solution of sodium carbonate.

After 2 hours condensation at about 40° C. the solution is cooled at 2–3° C., and 23.0 parts (0.1 mol) of the diazo of 4-amino-acetanilide-3-sulfonic acid (prepared according to BIOS 1548, page 48) is poured therein while the pH is maintained at the value of 7–7.5 by gradual dropwise addition of a 20% solution of $Na_2CO_3$.

The dyestuff is then precipitated by salting out, and then it is filtered under vacuum and dried in a stove at 35–40° C. for 48 hours.

Example 3

One works exactly as described in Example 2, but the dyestuff having the formula

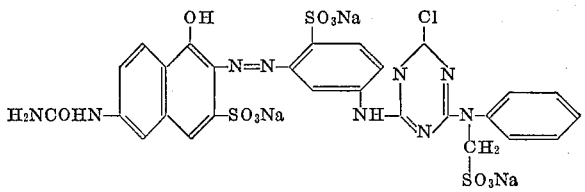

is used.

A quaternized dyestuff which dyes cotton at 35–40° C., with high tinctorial yields, in an orange shade showing very good fastness to washing is obtained.

The dyestuff to be quaternized used in the process of this example can be obtained as follows:

0.1 mol (18.44 parts) cyanuric chloride is dissolved in 100–150 parts by volume acetone and the solution is poured in water and ice (total amount 200–600 parts).

Onto the thus obtained suspension of cyanuric chloride, a neutral solution of 0.1 mol (20.9 parts) of

$C_6H_5NHCH_2SO_3Na$ in 100–130 parts by volume water, cooled with ice at 2–4° C. is poured within 20–40 minutes and under agitation.

During the addition the temperature of the reaction mass is maintained between 0 and 2° C. and the pH between 5 and 6 by suitable pouring of acid acceptor solutions (20% $Na_2CO_3$ solution; 1 N NaOH solution; $NaHCO_3$ and if necessary also Na acetate).

At the end of the addition of the sodium salt of anilino methane sulfonic acid, the agitation is continued until the dissolution is complete (about 2 hours), always keeping the temperature of the reaction mass between 0 and 2° C. and the pH between 5 and 6.

After this period of time, the solution obtained is neutralized with 1 N NaOH or with a 10% solution of $Na_2CO_3$ and if necessary is made clear from traces of insoluble residue.

Thus the monocondensation product, the sodium salt of 4,6-dichloro-s-triazin-2-yl-anilino methane sulfonic acid, is obtained.

After two hours agitation at 0–3° C. a solution of 18.8 parts (0.1 mol) of the 3-amino-4-sulfo-aniline having a pH 7 in 150 parts water is added. The whole is heated at about 40° C. and the pH is always adjusted at a value between 5.5 and 6.0 by gradual addition of 50–55 parts by volume of a 10% w./v. solution of sodium carbonate.

After 2 hours agitation at about 40° C., the solution is cooled to 2–3° C., and 6.9 parts (0.1 mol) of sodium nitrite (in the form of an aqueous 20% w./v. solution), 80 parts ice and 25.7 parts of 21 Bé HCl are added in a thin stream.

The reaction mass is agitated for about 10 minutes at the temperature of 3–4° C.

The suspension of the diazo thus obtained is added within about 30 minutes to a solution of 0.1 mol of carbamylisogamma acid (in the form of its sodium salt) in 350 parts by volume, together with 150 parts NaCl.

The solution, within 2–3 hours, is added with a 10% solution of $Na_2CO_3$ introduced dropwise and keeping the pH at the value of 7–7.5.

The dyestuff is separated by filtration and after washing with a 7% brine is dried in a stove at 40° C. for 48 hours.

Example 4

The work is carried out exactly as described in Example 1, but using the dyestuff:

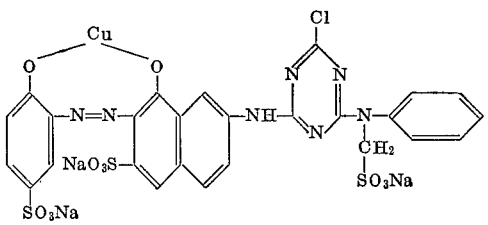

The thus obtained quaternized dyestuff dyes cotton from an aqueous bath at 35–40° C. with very good tinctorial yields, and a ruby shade having very good fastness to washing.

The dyestuff to be quaternized used in the process of this example can be obtained as follows:

18.9 parts (0.1 mol) of the 2-amino-phenol-4-sulfonic acid are directly diazotized, in suspension, at 0–5° C.

The solution of the diazo (about 250 parts by volume), after neutralization to Congo red with sodium carbonate, is coupled with isogamma acid. (25.1 parts corresponding to about 0.105 mol) at pH 9–9.5 and at a temperature of 0–5° C.

The solution of the monoazo thus obtained (500 parts by volume) is heated at 60° C. and is mixed with a solution containing 1 equivalent $CuSO_4 \cdot 5H_2O$ (25 parts) and with a solution containing 2 equivalents of crystallized sodium acetate (27 parts).

The metallization is complete within 1–2 hours at 60–65° C. and at a pH of about 6.

The separation of the Cu complex is carried out after cooling and 10% (w./v.) salting, by filtration.

The cake of the metallized monoazo dissolves in 500 parts by volume water, at a pH of 7–7.5. To the solution thus obtained, the solution of 0.13 mol of the monocondensation product between cyanuric chloride and the sodium salt of anilino methanesulfonic acid, prepared according to the modalities described in Example 1, is added at room temperature.

The solution thus obtained is mixed with 14 parts (0.1 mol) of crystallized sodium acetate, is heated on a water bath at 40–45° C. and is maintained at this temperature for 2–4 hours in order to complete the reaction.

The pH is kept at 5.8–6 by addition of alkalies ($Na_2CO_3$, $NaHCO_3$, etc.; volume about 100 parts).

Example 5

One works as described in Example 1, but using the dyestuff:

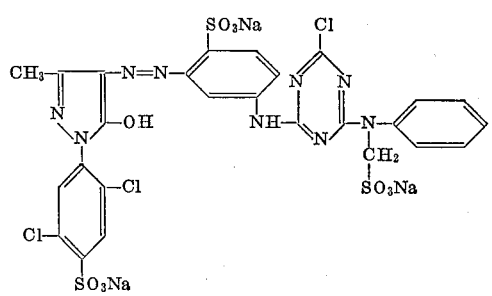

The quaternized dyestuff thus obtained dyes cotton from an aqueous bath at 35–40° C., with very good tinctorial yields in a yellow shade having very good fastness to wet treatments.

The dyestuff to be quaternized used in the process of this example can be obtained as follows:

0.1 mol (18.44 parts) of cyanuric chloride are dissolved in 100–150 parts by volume acetone and the solution is poured on water and ice (200–600 parts in total).

On the suspension of the cyanuric chloride thus obtained, the neutral solution consisting of 0.1 mol (20.9 parts) of $C_6H_5NHCH_2SO_3Na$ in 100–130 parts by volume water, cooled at 2–4° C. with ice is poured dropwise. During the addition the temperature of the reaction mass is maintained between 0 and 2° C. and the pH between 5 and 6 by suitable pouring dropwise of acid acceptor solutions. (20% solution of $Na_2CO_3$, 1 N NaOH, $NaHCO_3$, and if desired Na acetate.)

At the end of the addition of the sodium salt of the anilino-methanesulfonic acid the agitation is continued until the dissolution is complete (about 2 hours), keeping the temperature of the reaction mass between 0 and 2° C. and the pH between 5 and 6.

After this period of time, the solution thus obtained is neutralized with 1 N NaOH or with 10% solution of $Na_2CO_3$ and is purified. if necessary, from the traces of insoluble residue.

Thus, the monocondensation product, the sodium salt of the 4,6-dichloro-s-triazin-2-yl-anilino-methanesulfonic acid is obtained.

After 2 hours agitation at 0–3° C. a solution of 18.8 parts (0.1 mol) of 3-amino-4-sulfo-aniline in 150 parts water having a pH of 7 is added.

The whole is heated at about 40° C. and by keeping this temperature constant, the pH is always adjusted between 5.5 and 6.0 by gradual addition of 50–55 parts by volume of a 10% w./v. solution of sodium carbonate.

After 2 hours agitation at about 40° C. the solution is cooled at 2–3° C. and 6.9 parts (0.1 mol) of sodium nitrite (in form of an aqueous 20% w./v. solution), 80 parts of ice and 25.7 parts of 21° Bé. HCl in form of a thin stream are introduced.

The reaction mass is agitated for about 10 minutes at the temperature of 3–4° C.

The solution of a diazo is poured within 15 minutes in the solution of 32.3 parts (0.1 mol) of 1-(2′,5′-dichloro-4′-sulfophenyl)-3-methyl-5-pyrazolone in 150 parts water and 13 parts sodium carbonate, previously cooled at about 5° C. and added immediately before the couping with 60 parts of crystallized sodium acetate.

The dyestuff is then precipitated by salting out filtered under vacuum and dried as much as possible and then dried in a stove at 35–40° C. for 48 hours.

Example 6

A dye bath is prepared by dissolving 2 parts by weight of the dystuff prepared according to the Example 5, in 2000 parts by volume of water at the temperature of 35° C.

100 parts of the cellulose material are introduced in the dye bath; after 15 minutes, 60 parts of anhydrous $Na_2SO_4$ are added; after 30 minutes, 60 part of anhydrous $Na_2SO_4$ are added; after 45 minutes, 15 parts of $Na_2CO_3$ are added; after 60 minutes, 15 parts of $Na_2CO_3$ are added. The bath is maintained at 35° C., for a further hour, in order to complete the fixing of the dyestuff, and then the material is soaped for 30 minutes at boiling with a 3% soap solution.

The material is rinsed thoroughly with water.

A cellulose material dyed in a yellow shade having very good fastness to wet treatment is obtained, with very good tinctorial yields.

Example 7

A dye bath is prepared by dissolving 2 parts by weight of the dyestuff prepared according to the Example 5, in 2000 parts by volume of water, at the temperature of 50° C.

100 parts of the cellulose material are introduced in the dye bath; after 15 minutes at the temperature of 50° C., 60 parts of anhydrous $Na_2SO_4$ is added; after 30 minutes at the temperature of 60° C., 60 parts of anhydrous $Na_2SO_4$ are added; after 45 minutes at the temperature of 70° C., 15 parts of $Na_2CO_3$ are added; after 60 minutes at the temperature of 80° C., 15 parts of $Na_2CO_3$ are added. The bath is kept at 80° C. for one further hour. The material is soaped for 30 minutes at the boiling with a soap solution. The material is well rinsed with water.

A cellulose material dyed in a yellow shade having very good fastness to wet treatment is obtained, with very good tinctorial yields.

Example 8

2 parts of isonicotinic acid and 0.64 part of 100% NaOH are dissolved in 100 parts of water, at 80° C. 5 parts of the dyestuff:

are added to the solution.

The solution is maintained at this temperature for one night (about 15 hours), and then the dyestuff is separated by direct drying at about 60° C.

The dyestuff obtained dyes cotton at the temperature of 60° C. with good tinctorial yields, in a blue shade having very good fastness to washing.

The dyestuff to be quaternized used in the process can be obtained as follows:

0.1 mol of 1-amino-4-(3′-amino-anilino-)-2 anthraquinone sulfonic acid are salified in 1500 parts of water by addition of sodium carbonate.

The mass is then slowly added, at 0–5° C., to a solution (kept at 0–5° C.) of the compound obtained according to the description of Example 1 by condensation between 0.1 mol of cyanuric chloride and 0.1 mol of the sodium salt of anilino-methanesulfonic acid added with 10 parts of sodium bicarbonate.

The temperature is then permitted to rise to 20–25° C., and is kept at this value until the condensation is ended.

The dyestuff having the following composition is separated by salting out.

Example 9

The operation is carried out exactly as described in Example 8, but using 4 parts of the dyestuff:

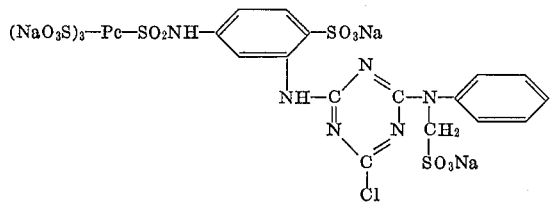

wherein Pc means copper phthalocyanine.

The dyestuff obtained dyes cotton at the temperature of 60° C., with good tinctorial yields, in a turquoise shade having very good fastness to washing. The dyestuff to be quaternized used in this process can be obtained as follows:

0.1 mol of the intermediate having the following structure:

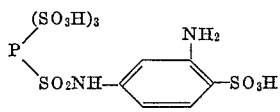

wherein Pc means copper phthalocyanine, are added under agitation, in the form of a paste, in 2000 parts of water and the pH is adjusted at a value of 8 by adding little amounts of NaOH.

The solution thus obtained is slowly added at 0–5° C. to a solution (which is also kept at 0–5° C.) of the condensation product between 0.1 mol of cyanuric chloride and 0.1 mol of the sodium salt of the anilino-methanesulfonic acid added with 10 parts of sodium bicarbonate.

(The condensation product between cyanuric chloride and the sodium salt of the anilino-methanesulfonic acid can be prepared, for instance, by dissolving, in 500 parts of water, 0.1 mol of the sodium salt of the anilino-methanesulfanic acid and adding 17 parts of sodium bicarbonate and successively, at a temperature of 0–5° C., a suspension (kept at 0–5° C.) of 0.1 mol of cyanuric chloride in 1500 parts of water).

The whole is agitated for some hours at increasing temperature up to 20–25° C., till a sample shows that the reaction is ended.

The reaction product is separated by salting.

Example 10

By working as described in the preceding example, but using the dyestuff having the structure:

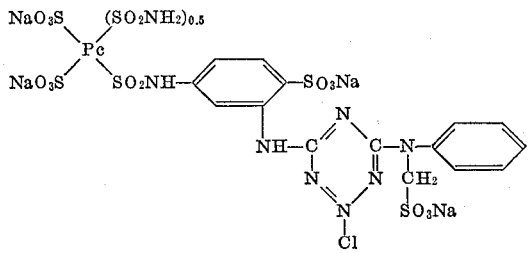

wherein Pc means copper phthalocyanine, a quaternized dyestuff is obtained having characteristics similar to those of the dyestuff of Example 9.

Example 11

A dye bath is prepared by dissolving 2 parts by weight of the dyestuff prepared according to the Example 10, in 2000 parts by volume of water at the temperature of 60° C.

100 parts of the cellulose material are introduced in the dye bath; after 15 minutes 60 parts of anhydrous $Na_2SO_4$ are added; after 30 minutes 60 parts of anhydrous $Na_2SO_4$ are added; after 45 minutes 15 parts of $Na_2CO_3$ are added; after 60 minutes 15 parts of $Na_2CO_3$ are added.

The bath is maintained at 60° C. for one further hour, in order to complete the fixing of the dyestuff and then the material is soaped for 30 minutes at the boiling point with a 3% soap solution.

A cellulose material dyed in a turquoise shade having very good fastness to wet treatment is obtained with very good tinctorial yields.

With the same procedure, the quaternized dyestuff of Example 8 can also be applied.

What is claimed is:

1. The reactive dyestuff having the formula:

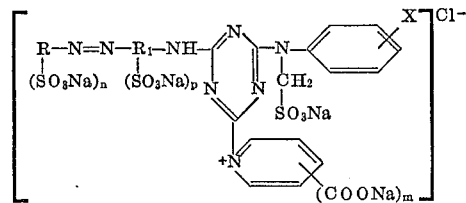

wherein X is selected from the group consisting of H, $CH_3$, $-OCH_3$ and $-OCH_2H_5$; $m$ is 1 or 2; $n$ and $p$ are each 0 or an integer from 1 to 4, and the sum of $n$ and $p$ is from 1 to 4; R is a nucleus selected from the group consisting of the nuclei of the phenyl, naphthyl and pyrazolone series; and $R_1$ is a nucleus selected from the group consisting of the nuclei of the phenyl and naphthyl series.

2. The reactive dyestuff of claim 1 having the formula:

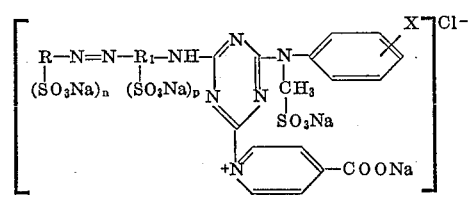

3. The reactive dyestuff of claim 2 having the structure:

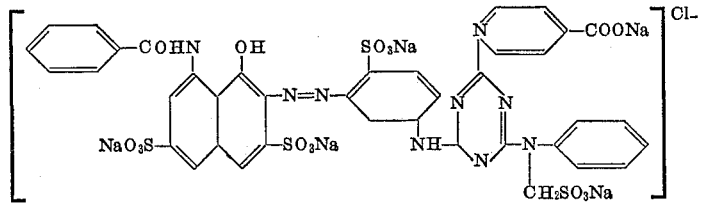

4. The reactive dyestuff of claim 2 having the structure:
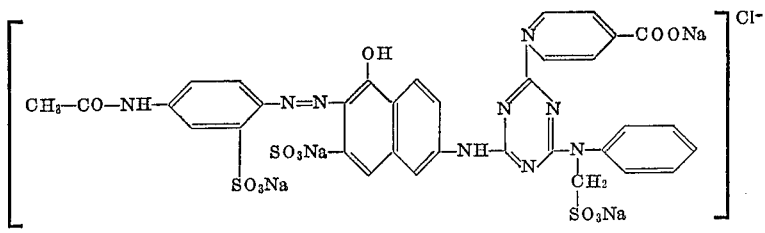
5. The reactive dyestuff of claim 2 having the structure:
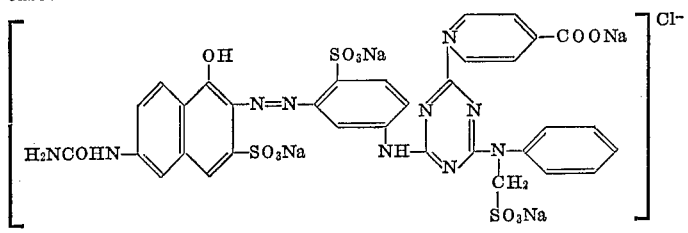
6. The reactive dyestuff of claim 2 having the structure:
7. The reactive dyestuff of claim 2 having the structure:
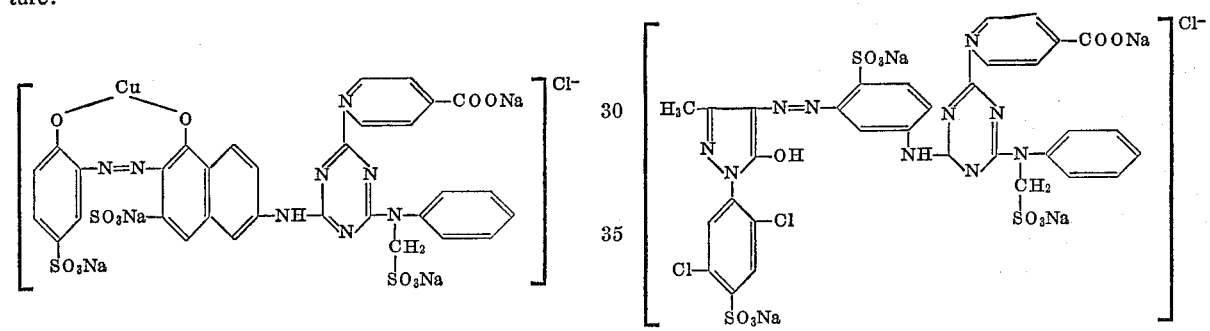
References Cited
UNITED STATES PATENTS
3,116,275 12/1963 Gamlen et al. _____ 260—146
FOREIGN PATENTS
946,998 1/1964 Great Britain.
FLOYD DALE HIGEL, Primary Examiner
U.S. Cl. X.R.
260—153, 242, 249; 8—41, 42, 39, 40, 54.2

PO-1050
(5/69)

UNITED STATES PATENT OFFICE
CERTIFICATE OF CORRECTION

Patent No. 3,522,232      Dated July 28, 1970

Inventor(s) Sandro Ponzini, Paolo Castelli and Jean S. Lawendel

It is certified that error appears in the above-identified patent and that said Letters Patent are hereby corrected as shown below:

Column 1, first structural formula, "Ch    en-NH-
$|$
$(SO_3Na)_n$ " should read
-- Chromogen-NH-
$|$
$(SO_3Na)_n$ --; first structural formula, "X $]$ should read
-- X $]Cl^-$ " 
, --; second structural formula, "Chromogen-NH-
$|$
$(SO_3Na)_n$ " should
read -- Chromogen-NH-
$|$
$(SO_3Na)_n$ --. Column 2, after the first structural formula, before line 12 -- wherein X and n have the above mentioned meanings and m is 1 or 2. The chromogen may be an azoic, azoic metallized, anthraquinone or phthalocyanine dyestuff. -- should be inserted; lines 24, 25 and 26, the entire passage, "wherein X and n have the above mentioned meanings and m is 1 or 2. The chromogen may be an azoic, azoic-metallized, anthraquinone or phthalocyanine dyestuff.", should be deleted; the second structural formula, "

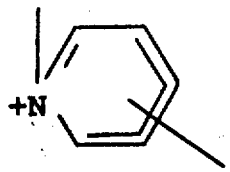 should read 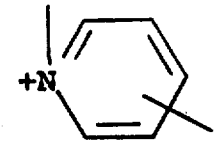

PR

PO-1050
(5/69)

UNITED STATES PATENT OFFICE
CERTIFICATE OF CORRECTION

Patent No. 3,522,232                    Dated July 28, 1970

Inventor(s) Sandro Ponzini, Paolo Castelli and Jean S. Lawendel

It is certified that error appears in the above-identified patent and that said Letters Patent are hereby corrected as shown below:

Column 2, line 62, "the namely:" should read -- namely: --; line 69, "tertiary the isonicotinic" should read -- tertiary amines, isonicotinic --. Column 3, line 9, "in advantageous" should read -- is advantageous --; line 14, "quternization" should read -- quaternization --; the structural formula in Example 1,

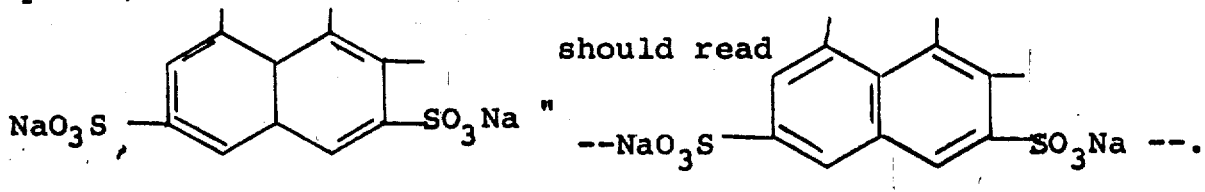

Column 4, the structural formula in Example 2,

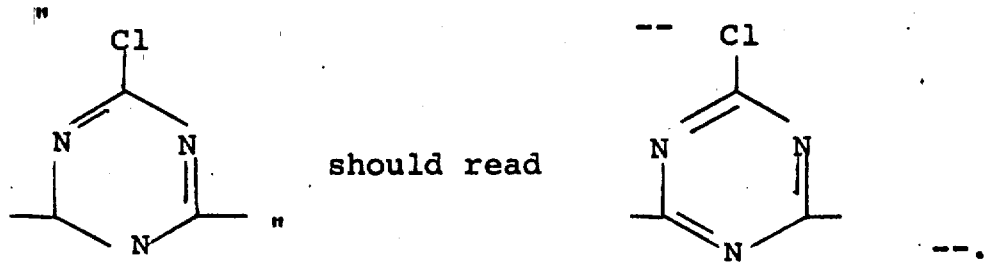

Column 5, the structural formula in Example 3,

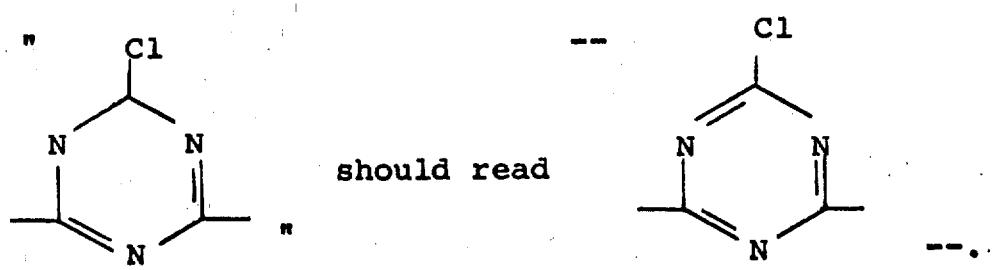

PO-1050
(5/69)

UNITED STATES PATENT OFFICE
CERTIFICATE OF CORRECTION

Patent No. 3,522,232          Dated  July 28, 1970

Inventor(s) Sandro Ponzini, Paolo Castelli and Jean S. Lawendel

It is certified that error appears in the above-identified patent and that said Letters Patent are hereby corrected as shown below:

Column 5, line 72, "21 Bé" should read -- 21° Bé --. Column 6, line 27, "and a ruby" should read -- in a ruby --; line 34, "Congo red" should read -- Congo Red --; line 40, "equivalent $CuSO_4 \cdot 5H_2O$" should read -- equivalent of $CuSO_4 \cdot 5H_2O$ --.

Column 7, line 57, "dystuff" should read -- dyestuff --.
Column 9, the second structural formula in Example 9,

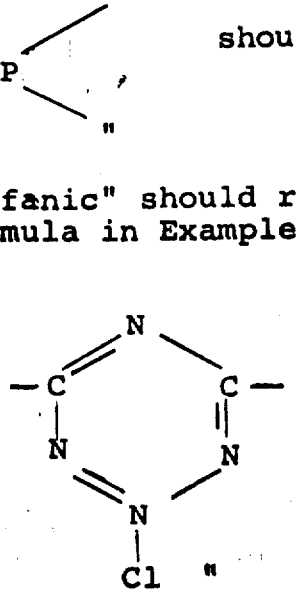  should read   --; line 42, "methane-sulfanic" should read -- methanesulfonic --; the structural formula in Example 10,

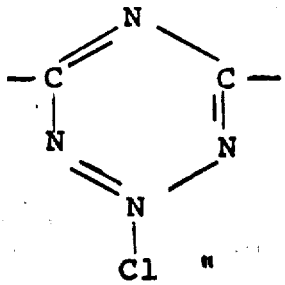  should read  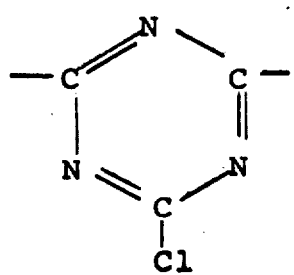 --.

PR

UNITED STATES PATENT OFFICE
CERTIFICATE OF CORRECTION

Patent No. 3,522,232  Dated July 28, 1970

Inventor(s) Sandro Ponzini, Paolo Castelli and Jean S. Lawendel

It is certified that error appears in the above-identified patent and that said Letters Patent are hereby corrected as shown below:

Column 10, the structural formula in claim 3 should read

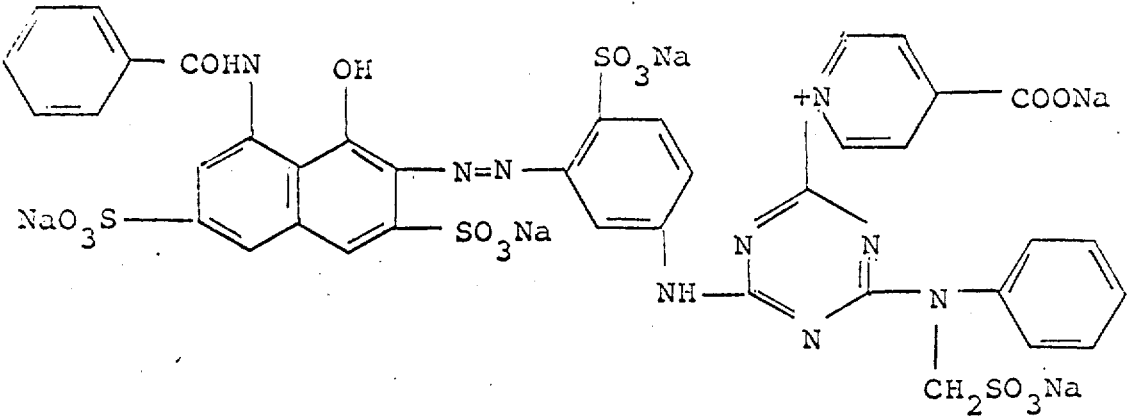

Column 11, claims 4, 5, 6 and 7, in the structural formula of each of these claims, the isonicotinic acid radical should read

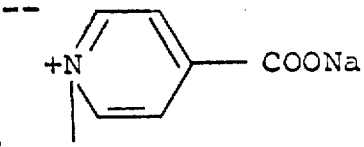

Column 11, claim 7 " 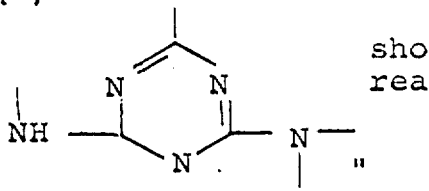 should read 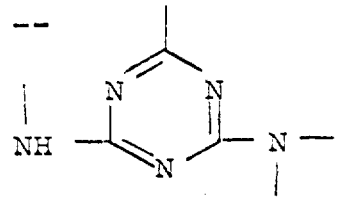 "

Signed and sealed this 16th day of May 1972.

(SEAL)
Attest:

EDWARD M. FLETCHER, JR.
Attesting Officer

ROBERT GOTTSCHALK
Commissioner of Patents